United States Patent
Tsirkin et al.

(10) Patent No.: US 11,822,663 B2
(45) Date of Patent: Nov. 21, 2023

(54) SUPERVISOR-BASED FIRMWARE HARDENING

(71) Applicant: Red Hat, Inc., Raleigh, NC (US)

(72) Inventors: Michael Tsirkin, Westford, MA (US); Amnon Ilan, Ra'anana (IL)

(73) Assignee: Red Hat, Inc., Raleigh, NC (US)

( * ) Notice: Subject to any disclaimer, the term of this patent is extended or adjusted under 35 U.S.C. 154(b) by 417 days.

(21) Appl. No.: 17/107,569

(22) Filed: Nov. 30, 2020

(65) Prior Publication Data

US 2022/0171852 A1    Jun. 2, 2022

(51) Int. Cl.
G06F 21/57 (2013.01)
G06F 21/64 (2013.01)
G06F 12/02 (2006.01)
G06F 21/60 (2013.01)

(52) U.S. Cl.
CPC ........ G06F 21/572 (2013.01); G06F 12/0238 (2013.01); G06F 21/602 (2013.01); G06F 21/64 (2013.01); *G06F 2212/402* (2013.01)

(58) Field of Classification Search
CPC .. G06F 21/572; G06F 12/0238; G06F 21/602; G06F 21/64; G06F 2212/402
USPC ................................. 713/1, 2, 100
See application file for complete search history.

(56) References Cited

U.S. PATENT DOCUMENTS

| | | | |
|---|---|---|---|
| 8,904,162 B2 | 12/2014 | Futral et al. | |
| 9,015,455 B2 | 4/2015 | Held et al. | |
| 9,934,022 B2 | 4/2018 | Marr et al. | |
| 10,177,934 B1 | 1/2019 | Marr et al. | |
| 2005/0005077 A1* | 1/2005 | Heinrich | G06F 21/572 711/154 |
| 2015/0154091 A1* | 6/2015 | Chen | G06F 11/1417 713/2 |
| 2017/0215074 A1 | 7/2017 | Choi et al. | |
| 2019/0363894 A1 | 11/2019 | Kumar Ujjwal | |
| 2020/0257518 A1 | 8/2020 | Liedtke et al. | |

OTHER PUBLICATIONS

Heller, Dave, et al., "OpenPower secure and trusted boot, Part 2: Protecting system firmware with OpenPower secure boot", IBM, https://developer.ibm.com/technologies/linux/articles/protect-system-firmware-openpower/, Feb. 23, 2019.

* cited by examiner

*Primary Examiner* — Michael J Brown
(74) *Attorney, Agent, or Firm* — Womble Bond Dickinson (US) LLP (57) ABSTRACT

Systems and methods for verifying firmware before it is loaded to a memory device are presented herein. An amount of available memory remaining in a memory device after firmware is written to the memory device is determined, and padding data having a size equal to the determined amount of remaining available memory is generated and appended to the firmware (e.g., the firmware is padded with the padding data). In this way, there is no room for malicious code or a malicious version of the firmware in the memory device. A processing device may determine a verification value of the padded firmware and store the verification value. The verification value may be a cryptographic hash of the padded firmware or a cryptographic signature of the padded firmware. The padded firmware is then written to the memory device. The firmware may be read from the memory device and verified using the verification value.

17 Claims, 7 Drawing Sheets

SUPERVISOR-BASED FIRMWARE HARDENING

TECHNICAL FIELD

Aspects of the present disclosure relate to operating systems, and more particularly, to secure verification of firmware by an operating system.

BACKGROUND

Containers are active components executing on an operating system that provide an environment for applications to run, while being isolated from any other components of a host machine, network, or data center etc. Multiple containers may execute on a single operating system kernel and share the resources of the hardware the operating system is running on. All of the files, libraries and dependencies necessary to run applications in a container may be provided by an image file(s). A programmable logic device may execute the operating system (and thus containers and applications) using firmware. Firmware may refer to the software used by the programmable logic device that provides the low-level control for the programmable logic device's specific hardware to e.g., execute the operating system, run containers and applications. Firmware can either provide a standardized operating environment for more complex device software (allowing more hardware-independence), or, for less complex devices, act as the device's complete operating system, performing all control, monitoring and data manipulation functions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Programmable devices (e.g., FPGAs, CPLDs etc.) are becoming more and more prevalent. Such devices may function as traditional back-end accelerators, tightly coupled off-load processors, smart network interface cards (NICs), or bump-in-the-wire devices, for example. However, such programmable devices also represent a security risk. For example, a malicious program (e.g., firmware) that mimics an original program and is loaded into a programmable device may become completely invisible, such that attempts by tools such as antivirus programs to verify the original program could be served by the original program itself, so that an innocent-looking original version could be returned to the antivirus program while the malicious program is still active.

Existing solutions for verifying firmware rely on techniques for detecting changes to programs such as checksums etc. However, in a device where the firmware can intercept program access itself, these techniques are not effective. A malicious copy of the firmware could be running, and when the host attempts to verify the firmware, the malicious copy may send the original (clean) firmware to the host so that the calculated checksums match.

The present disclosure addresses the above-noted and other deficiencies by using a processing device to determine an amount of available memory remaining in a memory device after firmware is written to the memory device, and generate padding data having a size equal to the determined amount of remaining available memory is generated. The processing device may append the padding data to the firmware (e.g., the firmware is padded with the padding data) and store it in the memory device. In this way, there is no room for malicious code or a malicious version of the firmware in the memory device. The processing device may determine a verification value of the padded firmware and store the verification value (e.g., in a hypervisor memory or by appending it to the padded firmware). The verification value may be a cryptographic hash of the padded firmware or a cryptographic signature of the padded firmware. The processing device may then write the firmware to the memory device. The processing device may read the firmware from the memory device and verify it using the verification value. In this way, if the code of the firmware is modified, the processing device can detect this based on the verification value.

Figure 1:
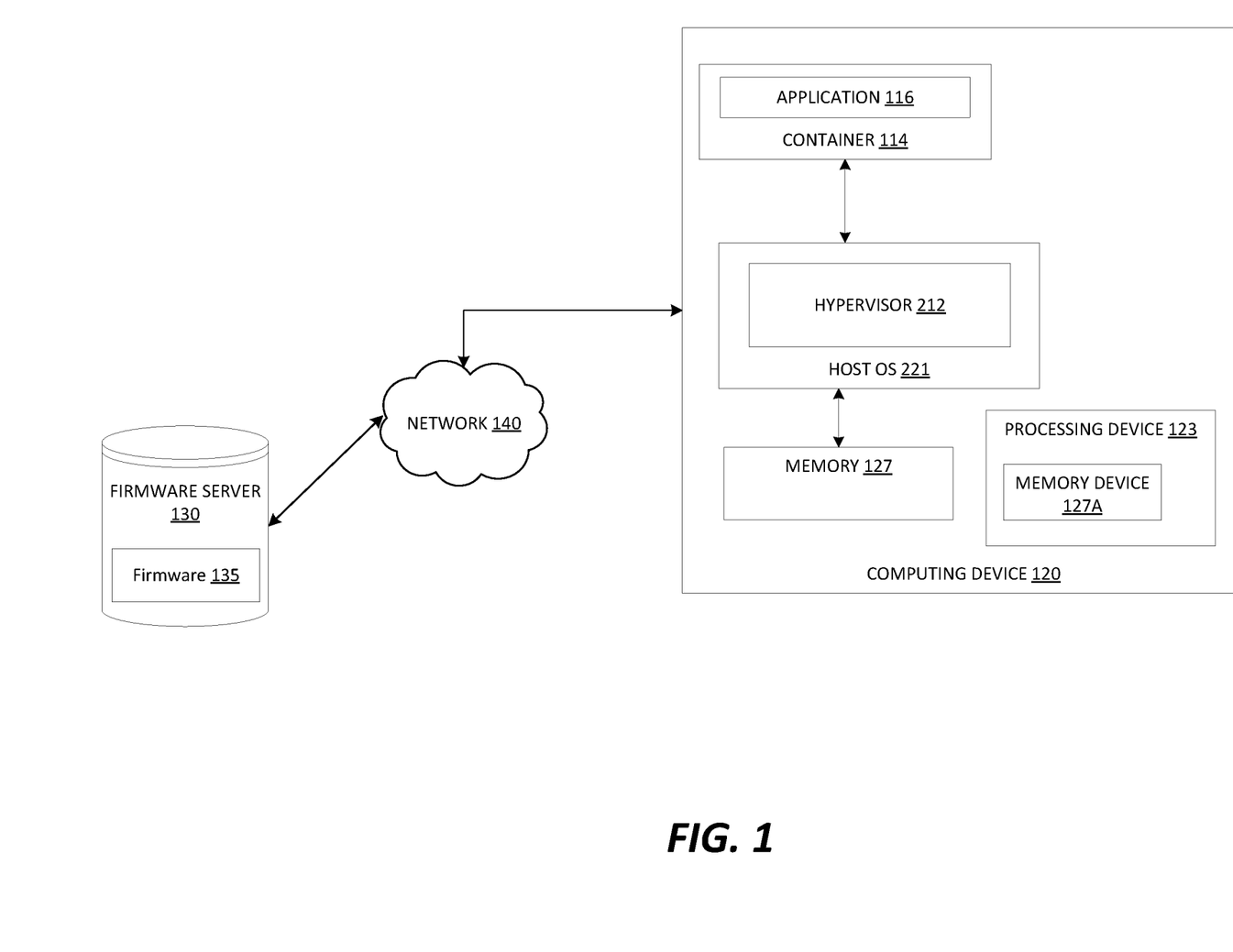
FIG. 1 is a block diagram that illustrates an example computing device coupled to a firmware server, in accordance with some embodiments of the present disclosure.

FIG. 1 is a block diagram that illustrates a computing device 120, a firmware server 130 and a network 140. The computing device 120 and the firmware server 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi hotspot connected with the network 140 and/or a wireless carrier system that can be implemented using various data processing equipment, communication towers (e.g. cell towers), etc. The network 140 may carry communications (e.g., data, message, packets, frames, etc.) between computing device 120 and firmware server 130. The computing device 120 and firmware server 130 may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

FIG. 1 and the other figures may use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral.

The computing device 120 may comprise any suitable type of computing device or machine that has a programmable processor (e.g., processing device 123) including, for example, server computers, desktop computers, laptop computers, tablet computers, smartphones, set-top boxes, etc. In some examples, the computing device 120 and firmware server 130 may comprise a single machine or may include multiple interconnected machines (e.g., multiple servers configured in a cluster). The computing device 120 and firmware server 130 may be implemented by a common entity/organization or may be implemented by different entities/organizations. For example, computing device 120 may be operated by a first company/corporation and firmware server 130 may be operated by a second company/corporation. The computing device 120 may execute or include an operating system (OS) referred to herein as host OS 221, as discussed in more detail below. The host OS 221 of computing device 120 may be stored in memory 127 (e.g., persistent storage) and may manage the execution of other components (e.g., software, applications, etc.) and/or may manage access to the hardware (e.g., processors, memory, storage devices etc.) of the computing device 120.

The host OS 221 may include a hypervisor 212, which may also be known as a virtual machine monitor (VMM). In the example shown, hypervisor 212 may be a component of the host operating system 211. In another example, hypervisor 212 may run on top of host operating system 211, or may run directly on host hardware without the use of a host operating system 211. Hypervisor 212 may manage system resources, including access to processing device 123, memory 127, other storage devices (e.g., HDDs, SSDs), and/or other devices (e.g., sound cards, video cards, etc.). The hypervisor 212, though typically implemented in software, may emulate and export a bare machine interface to higher level software in the form of virtual processors and guest memory (virtual resources). Higher level software may comprise a standard or real-time operating system (OS), may be a highly stripped down operating environment with limited operating system functionality, and/or may not include traditional OS facilities, etc. For example, higher level software may be a network virtualization platform (not shown) such as the RedHat™ OpenStack™ virtualization platform. Hypervisor 212 may present other software (i.e., "guest" software) the abstraction of one or more virtual machines (VMs) that provide the same or different abstractions to various guest software (e.g., guest operating system, guest applications).

As illustrated in FIG. 1, computing device 120 may run a container 114. In some embodiments, the container 114 may execute on a container engine (not shown) which executes on top of the host OS 221 of computing device 120, as discussed in more detail below. The container engine may allow different containers to share the host OS 221 (e.g., the OS kernel, packages, binaries, libraries thereof etc.) e.g., by multiplexing the packages 223 of the host OS 221 between multiple containers. The container engine may also facilitate interactions between the container 114 and the resources of the computing device 120. For example, the container engine may manage requests from container 114 to access a memory (e.g., a RAM) of the computing device 120. In another example, the container engine may manage requests from the container 114 to access certain packages of the host OS 221. The container engine may also create, remove, and manage containers. In one embodiment, the container engine may be a component of the host OS 221 (e.g., Red Hat™ Enterprise Linux). In another embodiment, the container engine may run on top of the host OS 221, or may run directly on host hardware without the use of a host OS 221. The container 114 may be isolated, in that it is not connected to any other device or component of computing device 120, whether virtual or otherwise. Container 114 may execute application 116.

The processing device 123 may be any suitable programmable logic device, and may include a memory device 127A which may be any appropriate memory device to which firmware for operation of the processing device 123 may be written. For example, memory device 127A may be a flash memory device, or any other suitable memory device. Firmware may refer to the software used by the processing device 123 that provides the low-level control for the processing device 123's specific hardware to e.g., execute the host OS 221, run containers and applications (e.g., application 116 executing within container 114), and perform other functions. Firmware can either provide a standardized operating environment for more complex device software (allowing more hardware-independence), or, for less complex devices, act as the device's complete operating system, performing all control, monitoring and data manipulation functions. Firmware may be loaded by processing device 123 at boot time of computing device 120 and the processing device 123 may utilize checksums or a key, for example, to verify the authenticity. For example, Secure Boot is a Unified Extensible Firmware Interface (UEFI) firmware security feature developed by the UEFI Consortium that ensures only immutable and signed software are loaded during the boot time. Secure Boot leverages digital signatures to validate the authenticity, source, and integrity of the code that is loaded. These validation steps are taken to prevent malicious code from being loaded and to prevent attacks, such as the installation of certain types of rootkits. However, as discussed above, for devices where firmware can intercept program access itself, the effectiveness of these methods is reduced.

Firmware server 130 may represent a server of a firmware provider (e.g., vendor, developer, distributer etc.) that stores files corresponding to firmware updates. In the example of FIG. 1, firmware server 130 includes firmware 135, which may be a firmware update for the firmware of the processing device 123.

Figure 2:
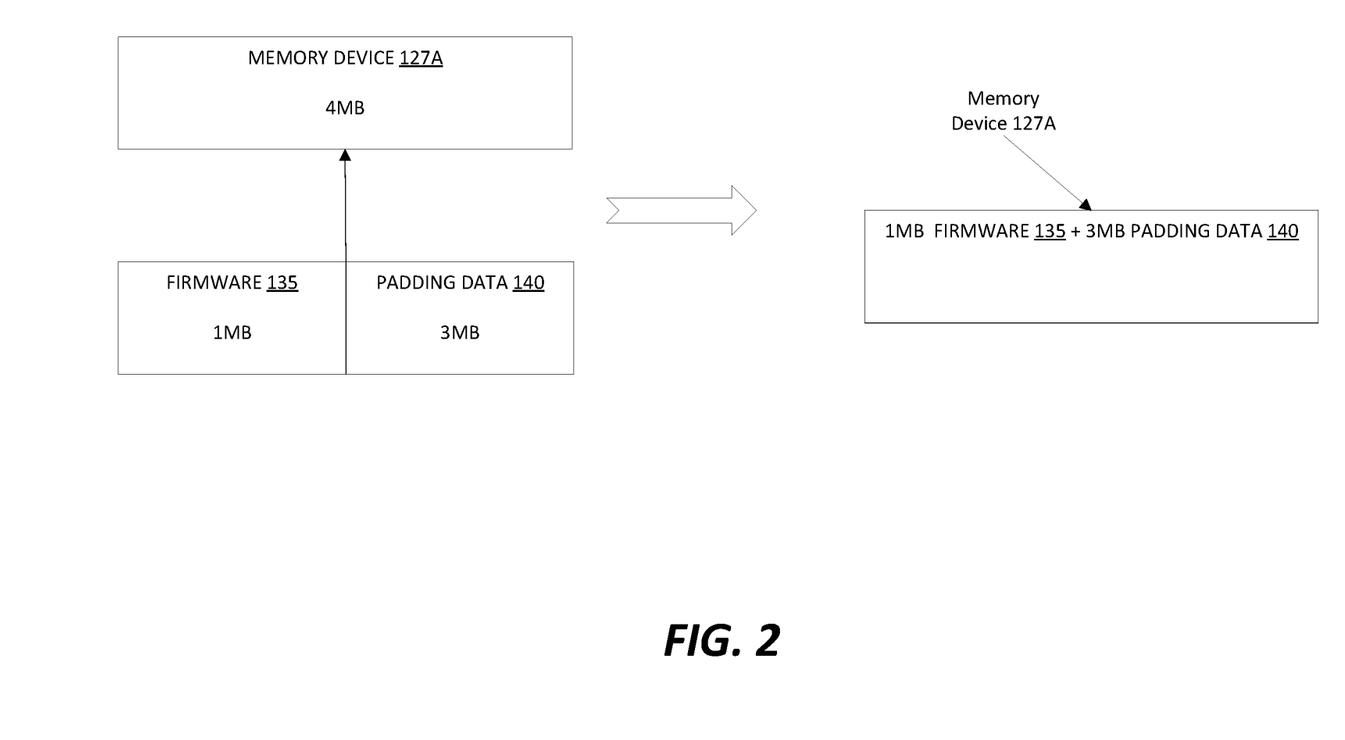
FIG. 2 is a block diagram that illustrates an example memory device to which firmware is to be written, in accordance with some embodiments of the present disclosure.
Figure 3A:
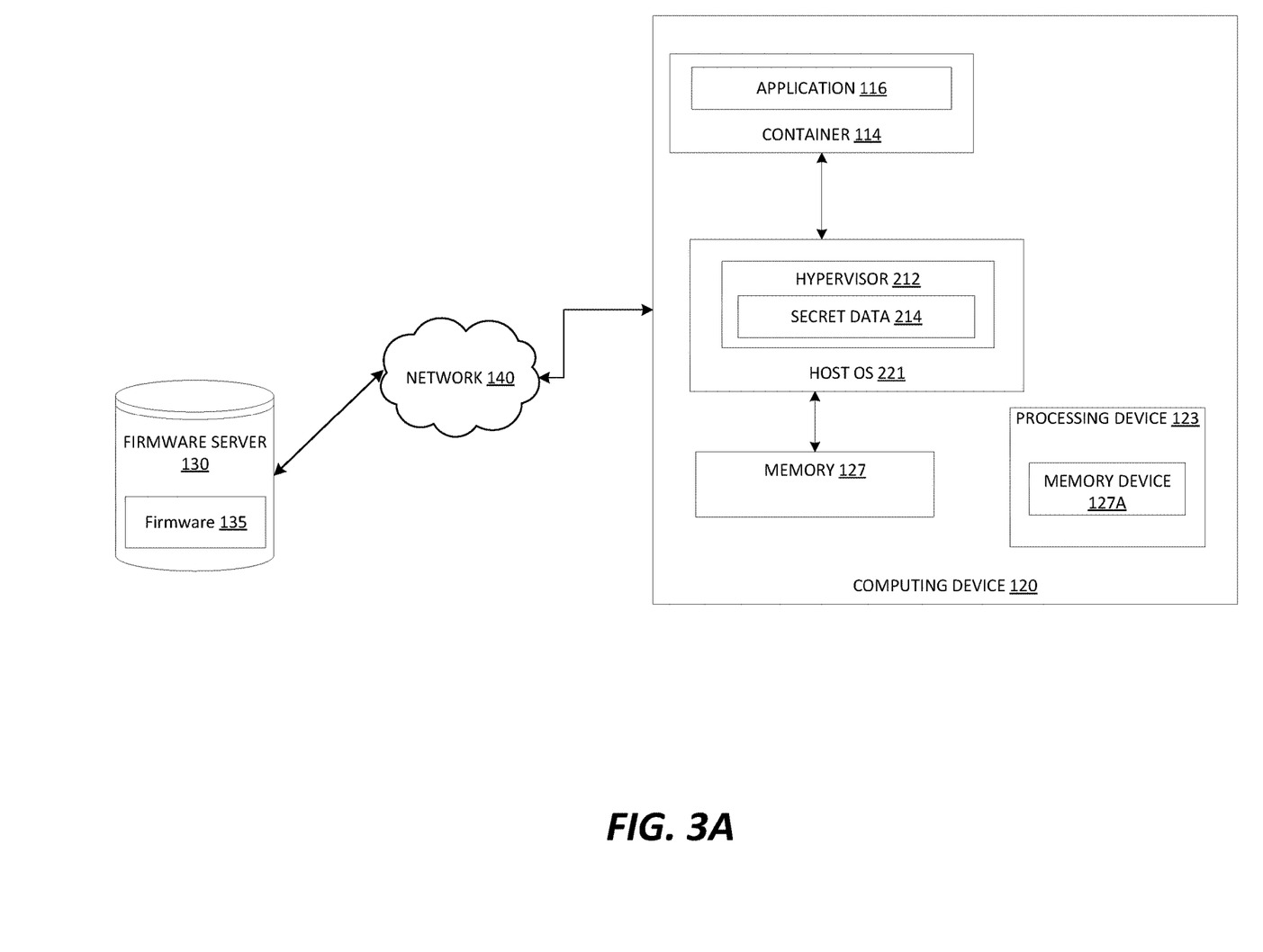
FIG. 3A is a block diagram that illustrates an example computing device, in accordance with some embodiments of the present disclosure.
Figure 3B:
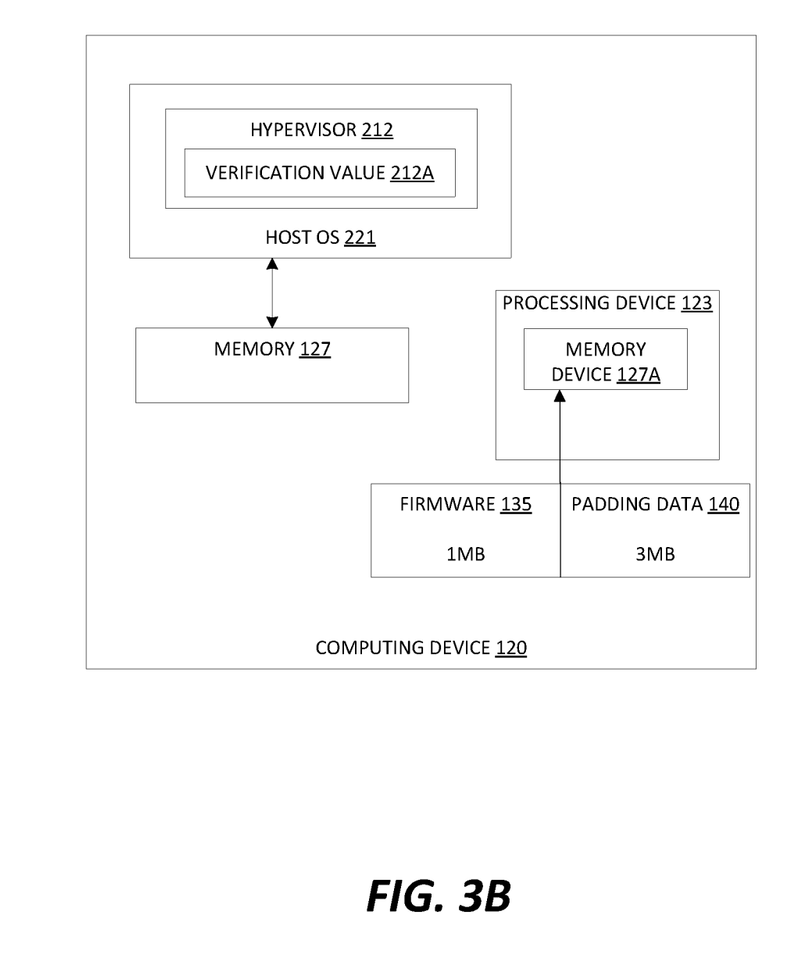
FIG. 3B is a block diagram that illustrates an example computing device, in accordance with some embodiments of the present disclosure.

Referring also to FIG. 3B, FIG. 2A illustrates the memory 127A of processing device 123, which may comprise a 4 MB flash memory device on which firmware 135 is to be written. The firmware 135 may be 1 MB in size and may comprise an image file obtained from e.g., a developer or vendor. Before writing firmware 135 to memory 127A, processing device 123 may calculate the amount of memory that will remain in memory 127A after firmware 135 has been written, and generate an amount of padding data 140 that is equal to the calculated amount of remaining memory in memory 127A after firmware 135 is written. Stated differently, processing device 123 may determine the amount of padding data 140 to generate by subtracting the size of the firmware 135 (in the example of FIG. 2A, 1 MB) from the total size of the memory device 127A (in the example of FIG. 2A, 4 MB), thereby leaving 3 MB. The processing device 123 may append the padding data 140 to the firmware 135 (which may now be "padded") and write the firmware 135 to the memory 127A. The padding data 140 may be any data that is unknown to computing device 120 such as random data, pseudo random data, or any data computing device 120 has no knowledge of. As can be seen in FIG. 2B, the padded firmware 135 now occupies the entire available space of memory 127A and thus there is no room for any malicious code. Even if a changed or altered version of the firmware 135 (e.g., including malicious code) is introduced, such a changed or altered version will be detectable as the memory 127A is not large enough to store both the firmware 135 (including padding data 140), as well as an altered (potentially malicious) version of the firmware 135.

Processing device 123 may then determine a cryptographic hash of the firmware 135 (including the padding data 140) to generate a first hash value (also referred to herein and illustrated in FIGS. 3A and 3B as a "verification value 212A"). The processing device 123 may store the first hash value in memory of hypervisor 212 such as an EFI variable or a protected disk sector. Processing device 123 may verify the firmware 135 by reading it back from the memory 127A, calculating the cryptographic hash a second time to generate a second hash value, and comparing the second hash value to the first hash value. If the first and second hash values are the same, then the processing device 123 may determine that the firmware 135 has not been tampered with (i.e. the firmware 135 is verified). If the first and second hash values are not the same (i.e. do not match) then the processing device 123 may determine that the firmware 135 has been tampered with. In this way, even if the firmware 135 is modified or altered to include malicious code, such modification or alteration will be detectable as the first and second hash values will not match.

As shown in FIGS. 3A and 3B, in some embodiments, the processing device 123 may utilize secret data 214 stored by the hypervisor 212 to "salt" the (padded) firmware 135 before calculating a cryptographic hash of the firmware 135 (including the padding data 140) to generate the first hash value. The secret data may comprise e.g., random bits that may be used as an additional input to the cryptographic hash function utilized by the processing device 123 to generate the first hash value. The processing device 123 may store the first hash value in a memory of hypervisor 212 such as an EFI variable or a protected disk sector. Processing device 123 may verify the firmware 135 by reading it back from the memory 127A, calculating the cryptographic hash of the firmware 135 a second time using the secret data 214 stored by the hypervisor 212 to generate a second hash value, and comparing the second hash value to the first hash value to verify the firmware 135 as discussed above.

In some embodiments, upon generating the first hash value, the processing device 123 may append the first hash value to the firmware 135 and then store the firmware 135 (now including both the padding data 140 and the first hash value) in the memory device 127A instead of hypervisor 212 memory. In these embodiments, processing device 123 may determine the amount of padding data (padding) to generate and add to the firmware 135 by subtracting the size of the first hash value and the size of the firmware 135 from the size of the memory device 127A, wherein the result is the amount of padding data 140 to be generated.

In some embodiments, the secret data stored by the hypervisor 212 may comprise a private key which the processing device 123 may combine with the firmware 135 to generate a cryptographic signature (which may be another example of a verification value 212A) of the firmware 135 (which includes the padding data 140). The processing device 123 may utilize an asymmetric encryption scheme such that the cryptographic signature can be verified by a public key related to the private key. The processing device 123 may append (not shown in the FIGS.) the cryptographic signature to the firmware 135 (which now includes the cryptographic signature along with the padding data 140) and may then write the firmware 135 to memory 127A. The processing device 123 may adjust the size of padding data 140 generated to account for the cryptographic signature by subtracting the size of the cryptographic signature and the size of the firmware 135 from the size of the memory device 127A, wherein the result is the amount of padding data 140 to be generated. Processing device 123 may verify the firmware 135 by reading the firmware 135 from the memory device 127A, and using the public key related to the private key to verify the cryptographic signature.

In some cases, compression may be a concern. While padding data is hard to compress, nothing prevents a malicious program from trying. In some embodiments, processing device 123 may further harden the firmware 135 by repeating the padding operation multiple times with different padding data each time. More specifically, the processing device 123 may generate padding data 140 and append it to the firmware 135 before writing the firmware 135 to the memory 127A as discussed herein. The processing device 123 may then read it back and verify it as discussed herein. Upon verifying the firmware 135, the processing device 123 may generate padding data 140 again (which is different data this time) as discussed above, and append it to the firmware 135 before writing the firmware 135 back to the memory 127A. The processing device 123 may repeat this operation any number of times.

Figure 4:
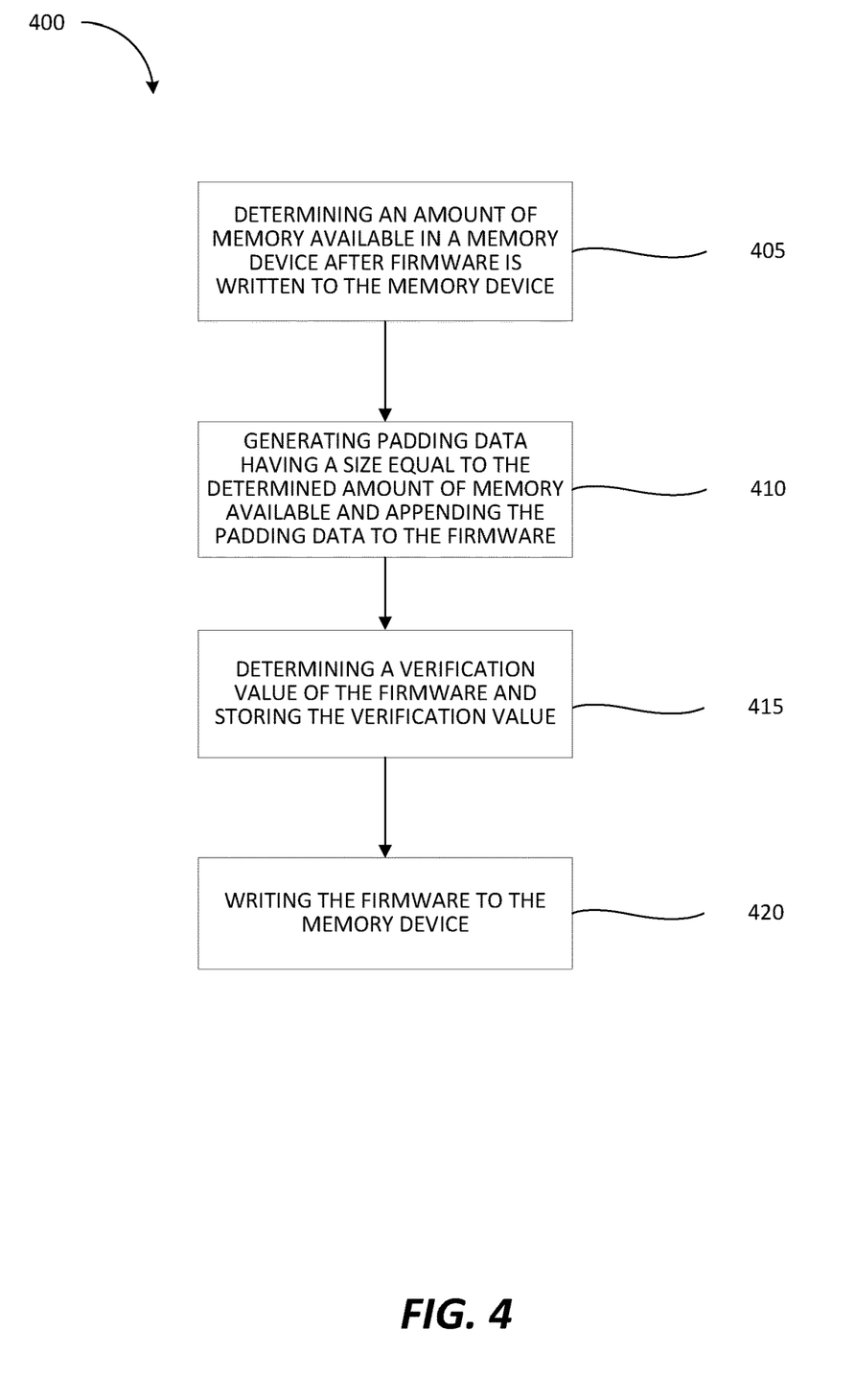
FIG. 4 is a flow diagram of a method for verifying firmware, in accordance with some embodiments of the present disclosure.

FIG. 4 is a flow diagram of a method 400 of verifying firmware, in accordance with some embodiments. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., computing device 120 illustrated in FIG. 1). For example, method 400 may be performed by processing device 123.

With reference to FIG. 1 as well, the method 400 begins at block 405 wherein, before writing firmware 135 to memory 127A, processing device 123 may calculate the amount of memory that will remain in memory 127A after firmware 135 has been written, and at block 410 may generate an amount of padding data 140 that is equal to the calculated amount of remaining memory in memory 127A after firmware 135 is written. The processing device 123 may append the padding data 140 to the firmware 135 and write the firmware 135 to the memory 127A. As can be seen in FIG. 2B, the firmware 135 now occupies the entire available space of memory 127A and thus there is no room for any malicious code. Even if a changed or altered version of the firmware 135 (e.g., including malicious code) is introduced, such a changed or altered version will be detectable as the memory 127A is not large enough to store both the firmware 135 (including padding data 140), as well as an altered (potentially malicious) version of the firmware 135.

At block 415, processing device 123 may then determine a verification value of the firmware 135 (including the padding data 140) and store the verification value. At block 420, the processing device 123 may write the firmware 135 to the memory 127A.

In some embodiments, processing device 123 may then determine a cryptographic hash of the firmware 135 (including the padding data 140) to generate a first hash value (the verification value). The processing device 123 may store the first hash value in memory of hypervisor 212 such as an EFI variable or a protected disk sector. At block 420, the processing device 123 may write the firmware 135 to the memory 127A. Processing device 123 may verify the firmware 135 by reading it back from the memory 127A, calculating the hash a second time to generate a second hash value, and comparing the second hash value to the first hash value. If the first and second hash values are the same, then the processing device 123 may determine that the firmware 135 has not been tampered with (i.e. the firmware 135 is verified). If the first and second hash values are not the same (i.e. do not match) then the processing device 123 may determine that the firmware 135 has been tampered with. In this way, even if the firmware 135 is modified or altered to include malicious code, such modification or alteration will be detectable as the first and second hash values will not match.

In other embodiments, processing device 123 may utilize the secret data stored by the hypervisor 212, which may comprise a private key, to generate a cryptographic signature (the verification value) of the firmware 135 (which includes the padding data 140). The processing device 123 may utilize an asymmetric encryption scheme such that the cryptographic signature can be verified by a public key related to the private key. The processing device 123 may append the cryptographic signature to the firmware 135 (which now includes the cryptographic signature along with the padding data 140) and may then write the firmware 135 to memory 127A. The processing device 123 may adjust the size of padding data 140 generated to account for the cryptographic signature by subtracting the size of the cryptographic signature and the size of the firmware 135 from the size of the memory device 127A, wherein the result is the amount of padding data 140 to be generated. Processing device 123 may verify the firmware 135 by reading the firmware 135 from the memory device 127A, and using the public key related to the private key to verify the cryptographic signature.

Figure 5:
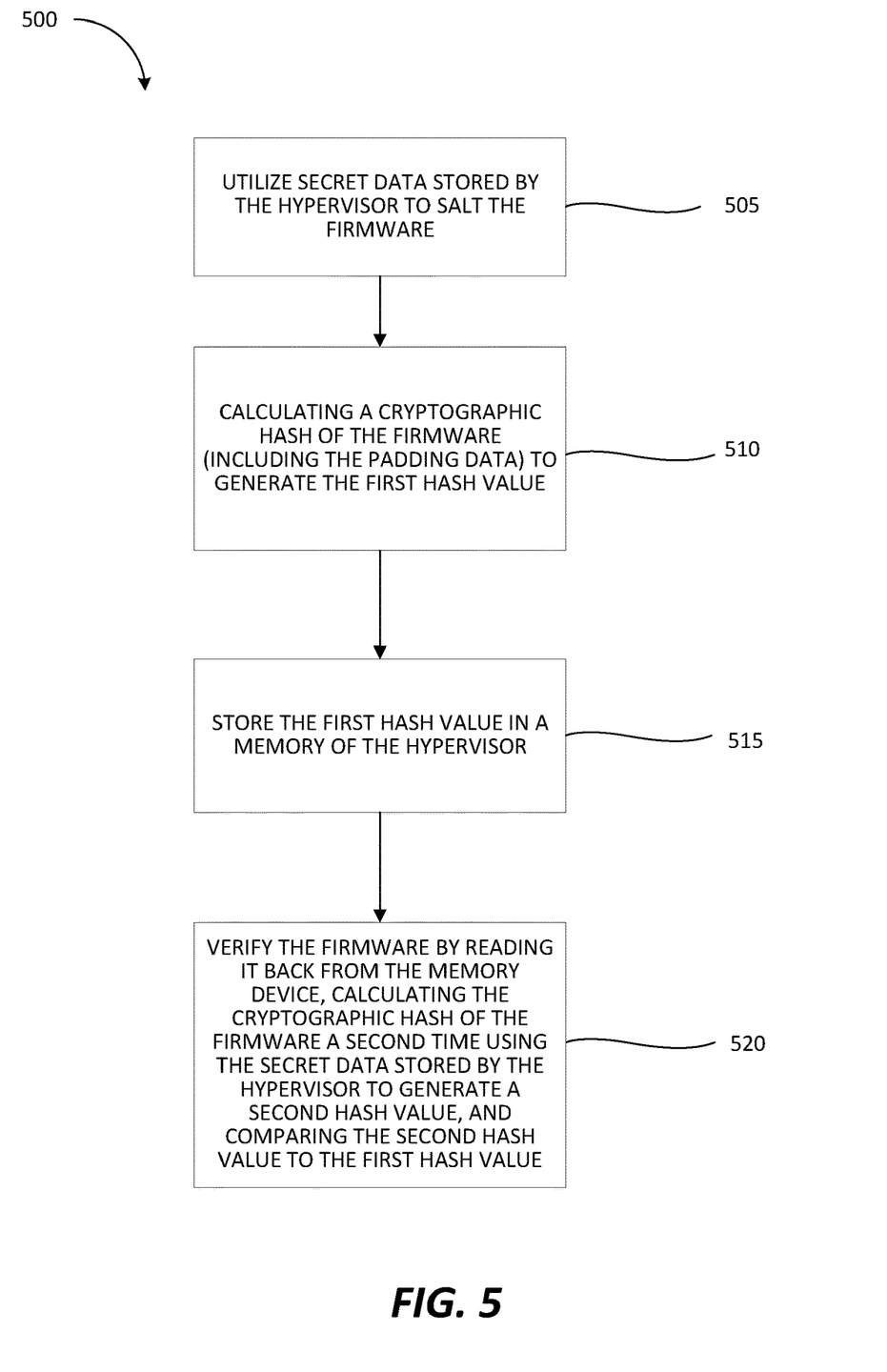
FIG. 5 is a flow diagram of a method for generating a verification value, in accordance with some embodiments of the present disclosure.

FIG. 5 is a flow diagram of a method 500 of generating a verification value, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 500 may be performed by a computing device (e.g., computing device 120 illustrated in FIG. 1). For example, method 500 may be performed by processing device 123.

Referring also to FIG. 3A, at block 505, the processing device 123 may utilize secret data 214 stored by the hypervisor 212 to "salt" the firmware 135 before calculating, at block 510, a cryptographic hash of the firmware 135 (including the padding data 140) to generate the first hash value. The secret data may comprise e.g., random bits that may be used as an additional input to the cryptographic hash function utilized by the processing device 123 to generate the first hash value. At block 515, the processing device 123 may store the first hash value in a memory of hypervisor 212 such as an EFI variable or a protected disk sector. At block 520, processing device 123 may verify the firmware 135 by reading it back from the memory 127A, calculating the cryptographic hash of the firmware 135 a second time using the secret data 214 stored by the hypervisor 212 to generate a second hash value, and comparing the second hash value to the first hash value to verify the firmware 135 as discussed above.

In some embodiments, upon generating the first hash value, the processing device 123 may append the first hash value to the firmware 135 and then store the firmware 135 (now including both the padding data 140 and the first hash value) in the memory device 127A instead of hypervisor 212 memory. In these embodiments, processing device 123 may determine the amount of padding data (padding) to generate and add to the firmware 135 by subtracting the size of the first hash value and the size of the firmware 135 from the size of the memory device 127A, wherein the result is the amount of padding data to be generated.

Figure 6:
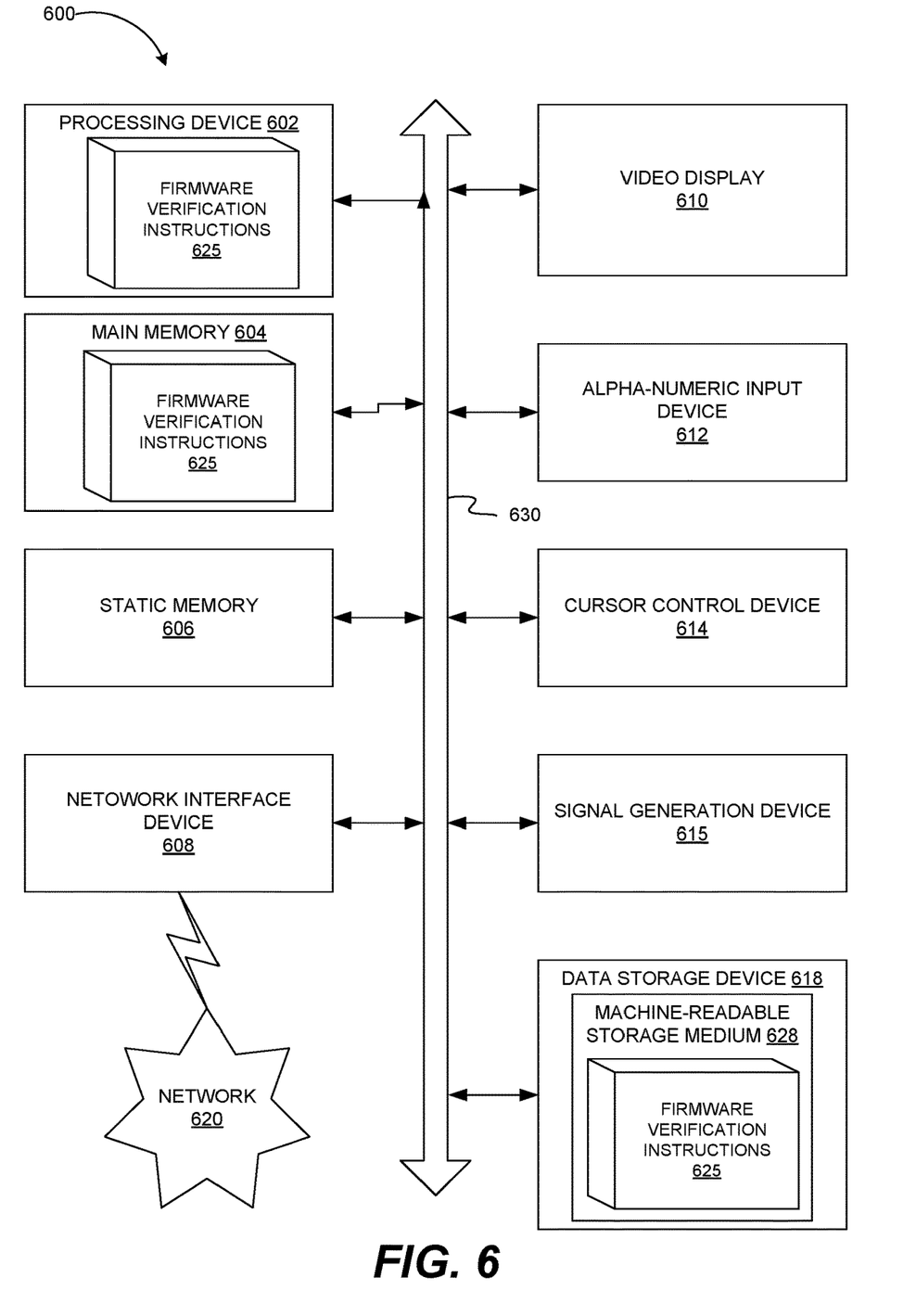
FIG. 6 is a block diagram of an example computing device that may perform one or more of the operations described herein, in accordance with some embodiments of the present disclosure.

FIG. 6 is a block diagram of an example computing device 600 that may perform one or more of the operations described herein for verifying firmware before it is loaded to a memory device, in accordance with some embodiments. For example, computing device 600 may determine an amount of available memory remaining in a memory device after firmware is written to the memory device, and generate padding data having a size equal to the determined amount of remaining available memory is generated. The computing device 600 may append the padding data to the firmware (e.g., the firmware is padded with the padding data) and store it in the memory device. In this way, there is no room for malicious code or a malicious version of the firmware in the memory device. A processing device may determine a verification value of the padded firmware and store the verification value. The verification value may be a cryptographic hash of the padded firmware or a cryptographic signature of the padded firmware. The firmware is then written to the memory device. The firmware may be read from the memory device and verified using the verification value.

Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of firmware verification instructions 625, e.g., instructions for carrying out the operations described herein, in accordance with one or more aspects of the present disclosure. Firmware verification instructions 625 may also reside, completely or at least partially, within main memory 604 and/or within processing device 602 during execution thereof by computing device 600, main memory 604 and processing device 602 also constituting computer-readable media. The firmware verification instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   determining an amount of available memory in a memory device after firmware is written to the memory device;
   generating padding data having a size equal to the determined amount of memory available and appending the padding data to the firmware;
   determining, by a processing device, a verification value of the firmware and storing the verification value;
   writing the firmware to the memory device; and
   verifying the firmware using the verification value.

2. The method of claim 1, wherein the verification value comprises a first hash value and determining the first hash value comprises:
   calculating a cryptographic hash of the firmware to generate the first hash value, wherein the first hash value is stored in a hypervisor memory.

3. The method of claim 2, wherein verifying the firmware comprises:
   reading the firmware from the memory device;
   calculating a cryptographic hash of the firmware to generate a second hash value of the firmware; and
   comparing the second hash value to the first hash value.

4. The method of claim 1, wherein the verification value comprises a cryptographic signature, and determining the cryptographic signature of the firmware comprises:
   using secret data to generate the cryptographic signature based on the firmware, wherein the secret data comprises a private key and wherein storing the cryptographic signature comprises appending the cryptographic signature to the firmware.

5. The method of claim 4, wherein verifying the firmware comprises:
   using a public key to verify the cryptographic signature.

6. The method of claim 1, further comprising:
   in response to verifying the firmware, generating second padding data having a size equal to the determined amount of memory available;
   deleting the padding data; and
   appending the second padding data to the firmware.

7. A system comprising:
   a memory to which firmware is to be written; and
   a processing device, operatively coupled to the memory, the processing device to:
      determine an amount of available memory in a memory device after firmware is written to the memory device;
      generate padding data having a size equal to the determined amount of memory available and append the padding data to the firmware;
      determine a verification value of the firmware and store the verification value;
      write the firmware to the memory device; and
      verify the firmware using the verification value.

8. The system of claim 7, wherein the verification value comprises a first hash value and wherein to determine the first hash value, the processing device is to:
   calculate a cryptographic hash of the firmware to generate the first hash value, wherein the first hash value is stored in a hypervisor memory.

9. The system of claim 8, wherein to verify the firmware, the processing device is to:
   read the firmware from the memory device;
   calculate a cryptographic hash of the firmware to generate a second hash value of the firmware; and
   compare the second hash value to the first hash value.

10. The system of claim 7, wherein the verification value comprises a cryptographic signature, and wherein to determine the cryptographic signature of the firmware, the processing device is to:
    use secret data to generate the cryptographic signature based on the firmware, wherein the secret data comprises a private key and wherein storing the cryptographic signature comprises appending the cryptographic signature to the firmware.

11. The system of claim 10, wherein to verify the firmware the processing device is to:
    use a public key to verify the cryptographic signature.

12. The system of claim 7, wherein the processing device is further to:
    in response to verifying the firmware, generate second padding data having a size equal to the determined amount of memory available;
    delete the padding data; and
    append the second padding data to the firmware.

13. A non-transitory computer-readable medium having instructions stored thereon which, when executed by a processing device, cause the processing device to:
    determine an amount of available memory in a memory device after firmware is written to the memory device;
    generate padding data having a size equal to the determined amount of memory available and append the padding data to the firmware;
    determine, by the processing device, a verification value of the firmware and store the verification value;
    write the firmware to the memory device; and
    verify the firmware using the verification value.

14. The non-transitory computer-readable medium of claim 13, wherein the verification value comprises a first hash value and wherein to determine the first hash value, the processing device is to:
    calculate a cryptographic hash of the firmware to generate the first hash value of the firmware, wherein the first hash value is stored in a hypervisor memory.

15. The non-transitory computer-readable medium of claim 14, wherein to verify the firmware, the processing device is to:
   read the firmware from the memory device;
   calculate a cryptographic hash of the firmware to generate a second hash value of the firmware; and
   compare the second hash value to the first hash value.

16. The non-transitory computer-readable medium of claim 13, wherein the verification value comprises a cryptographic signature, and wherein to determine the cryptographic signature of the firmware, the processing device is to:
   use secret data to generate the cryptographic signature based on the firmware, wherein the secret data comprises a private key and wherein storing the cryptographic signature comprises appending the cryptographic signature to the firmware.

17. The non-transitory computer-readable medium of claim 16, wherein to verify the firmware the processing device is to:
   use a public key to verify the cryptographic signature.

\* \* \* \* \*